US006302308B1

United States Patent
Hoover et al.

(10) Patent No.: US 6,302,308 B1
(45) Date of Patent: Oct. 16, 2001

(54) APPARATUS FOR HANDLING AND TEXTURIZING YARN HAVING ENHANCED FALSE TWISTER, ELECTRO-MECHANICAL YARN DETECTOR, AND YARN TAKE-UP DISTANCE EXTENDER AND ASSOCIATED METHODS

(75) Inventors: Donald Lynn Hoover, Cramerton; Ronnie Wayne Dye, Gastonia; Johnny Melvin Norris, Jr., Grover; Everett Lee Carswell, Gastonia, all of NC (US)

(73) Assignee: American Linc Corporation, Gastonia, NC (US)

( * ) Notice: Subject to any disclaimer, the term of this patent is extended or adjusted under 35 U.S.C. 154(b) by 0 days.

(21) Appl. No.: 09/394,764

(22) Filed: Sep. 13, 1999

(51) Int. Cl.[7] .............................. G03B 1/56; B23Q 15/00; D02G 1/12
(52) U.S. Cl. ........................... 226/90; 226/45; 226/118.2; 226/170; 28/221; 28/266; 28/268; 57/280; 242/417.3
(58) Field of Search ................................ 226/45, 90, 91, 226/118.2, 170; 242/154, 157 R, 363, 417.3, 615.4; 28/220, 221, 258, 266, 268; 57/280, 352

(56) References Cited

U.S. PATENT DOCUMENTS

| 4,283,024 | * | 8/1981 | Sienkiewicz | 242/417.3 X |
|---|---|---|---|---|
| 4,301,579 | * | 11/1981 | Van den Hoven | 28/268 X |
| 4,373,362 | * | 2/1983 | Fleissner | 226/45 X |
| 4,496,113 | * | 1/1985 | Dawson | 242/417.3 X |
| 5,190,202 | * | 3/1993 | Mischker et al. | 226/45 X |
| 5,483,730 | * | 1/1996 | Hoover | 28/289 |
| 5,775,079 | * | 7/1998 | Hoover | 57/59 |
| 6,209,301 | * | 4/2001 | Baader et al. | 57/280 |

FOREIGN PATENT DOCUMENTS 4236503   5/1994  (DE) .

* cited by examiner

Primary Examiner—Michael R. Mansen
(74) Attorney, Agent, or Firm—Allen, Dyer, Doppelt, Milbrath & Gilchrist, P.A.

(57) ABSTRACT

An apparatus and methods for handling and texturing yarn are provided. The apparatus preferably includes a yarn supply positioned to supply a plurality of strands of yarn, a false twister positioned downstream from the yarn supply for imparting a false twist to the plurality of strands of yarn, a yarn undulation former positioned downstream from the false twister for forming undulations in each of the plurality of strands of yarn, and a conveyor positioned to receive the plurality of yarn strands having undulations formed therein and for conveying the undulated strands of yarn downstream. The apparatus also preferably includes a heat setting oven positioned downstream from the yarn undulation former and to receive the conveyed yarn when passing therethrough to impart heat to the plurality of strands of yarn having undulations therein, a yarn sensor system positioned downstream from the heat setting oven for sensing the presence and absence of yarn being conveyed on the conveyor, a yarn take-up distance extender positioned downstream from the yarn sensor system for extending the distance of travel of the plurality of strands of yarn prior to take-up, and a yarn take-up source positioned downstream from the yarn take-up distance extender for receiving and taking up the plurality of strands of yarn.

8 Claims, 9 Drawing Sheets

APPARATUS FOR HANDLING AND TEXTURIZING YARN HAVING ENHANCED FALSE TWISTER, ELECTRO-MECHANICAL YARN DETECTOR, AND YARN TAKE-UP DISTANCE EXTENDER AND ASSOCIATED METHODS

FIELD OF THE INVENTION

The present invention is related to the textile industry and, more particularly, to the field of yarn handling and texturizing.

BACKGROUND OF THE INVENTION

In the textile industry, handling and texturizing yarn for numerous applications can be quite important. Various systems have been developed for handling yarn which include virtual twisters such as shown in U.S. Pat. No. 5,775,079 titled "Apparatus For Imparting Virtual Twist To Strand Material And Method Of Imparting Same" by Hoover, one of the co-inventors of the present application and also having the common assignee as the present application. Yarn stuffer boxes and yarn coilers have also been developed to assist in the process of texturizing yarn by forming crimps or undulations in the yarn with the use of a conveyor belt passing the crimped or undulations in the yarn through a heat oven. An example of such a coiler can be seen in U.S. Pat. No. 5,483,730 titled "Apparatus And Method For Forming Coils Of Yarn And For Heat Setting Same" also by Hoover and also having the common assignee as the present application.

Nevertheless, there is still a need for systems and devices which further enhance the handling and texturizing of yarn.

SUMMARY OF THE INVENTION

With the foregoing in mind, the present invention advantageously provides an apparatus and methods for handling and texturizing yarn or other strand material which has an enhanced false twister that allows more even feed of the yarn through the twister and to a take-up source. The present invention also advantageously provides an apparatus and methods for handling and texturizing yarn or other strand material which effectively detects the presence or absence of yarn in a simple and less complicated way. The present invention additionally advantageously provides an apparatus and methods for handling and texturizing yarn which has a yarn take-up distance extender which provides the capability to greatly extend the distance between yarn being delivered to a source such as from a conveyor to the take-up source so that tangling and other problems with a plurality of strands being delivered at substantially the same time are reduced. The present invention further advantageously provides a yarn handling roller for more effectively separating and handling a plurality of strands thereacross at substantially the same time.

More particularly, the present invention provides an apparatus for handling and texturing yarn which preferably includes a yarn supply positioned to supply a plurality of strands of yarn, a false twister positioned downstream from the yarn supply for imparting a false twist to the plurality of strands of yarn, a yarn undulation former positioned downstream from the false twister for forming undulations in each of the plurality of strands of yarn, and a conveyor positioned to receive the plurality of yarn strands having undulations formed therein and for conveying the undulated strands of yarn downstream. The apparatus also preferably includes a heat setting oven positioned downstream from the yarn undulation former and to receive the conveyed yarn when passing therethrough to impart heat to the plurality of strands of yarn having undulations therein, a yarn sensor system positioned downstream from the heat setting oven for sensing the presence and absence of yarn being conveyed on the conveyor, a yarn take-up distance extender positioned downstream from the yarn sensor system for extending the distance of travel of the plurality of strands of yarn prior to take-up, and a yarn take-up source positioned downstream from the yarn take-up distance extender for receiving and taking up the plurality of strands of yarn.

The present invention also provides a yarn false twister for imparting a false twist to a plurality of yarn strands. The yarn false twister preferably includes bi-directional radial twisting means for twisting a plurality of yarn strands in two different radial directions to impart a false twist thereto and twist point distance extending means connected to the bi-directional radial twisting means for extending the twist point distance of the plurality of yarn strands.

The present invention additionally provides an electro-mechanical sensor system for sensing the presence and absence of yarn. The electromechanical sensing system preferably includes at least one electro-mechanical yarn detector including a yarn contacting portion thereof positioned to abuttingly contacting yarn being transported on a conveyor when being conveyed thereon and a switch which activates when the yarn contacting portion is in a first yarn contacting position when contacting strands of yarn and when the yarn contacting portion is in a second yarn contacting position when not contacting strands of yarn. The system also includes a controller connected to the switch for controlling the speed of the take-up of the yarn responsive to the activation of the switch so that yarn take up speed increases when yarn is present and yarn take up speed decreases when yarn is absent. The electro-mechanical yarn sensing system of the present invention can also include another electro-mechanical detector having a yarn contacting portion overlying the conveyor and abuttingly contacting yarn when passing thereon and connected to the conveyor and the controller so that the controller also controls the speed of the yarn being fed to the undulation former, e.g., controlling the speed of draw rolls.

The present invention still additionally provides a strand handling roller for handling a plurality of strands of material traveling over and abuttingly contacting therewith. The strand handling roller preferably includes a roller body having outer end portions having a larger circumference than inner medial portions thereof so that strands traveling over the roller body slidingly moves toward the inner medial portions when traveling over and abuttingly contacting the strand handling roller. The circumference of the roller body gradually decreasing from the outer end portions to the inner medial portions. The strand handling roller can also advantageously include the roller body further having a plurality of spaced-apart strand grooves formed in the inner medial portions thereof for assisting in separating and guiding the plurality of strands when traveling over and abuttingly contacting the strand handling roller.

The present invention further provides a yarn take-up distance extender for extending the distance from a conveyor to a yarn take-up source. The yarn take-up distance extender preferably includes a retractable distance extending member overlying a conveyor and which retracts to a first yarn threading position adjacent the end portion of the conveyor and extends to a second yarn take-up operating position an extended distance from the first yarn threading position and in a direction away from a yarn take-up source for increasing the distance that the plurality of yarn strands travel from the conveyor prior to being taken up by the yarn take-up source. The yarn take-up distance extender can also have the conveyor extending in a substantially horizontal plane substantially parallel to a horizontally extending floor, and the yarn take-up distance extender further including a distance extending boom member connected to and extending outwardly from the conveyor in a direction vertically transverse to the conveyor. The retractable distance extending member is preferably connected to the distance extending boom member.

The present invention still further provides a method of imparting a false twist to a plurality of yarn strands. The method preferably includes twisting a plurality of yarn strands in two different radial directions to impart a false twist thereto and extending the twist point distance of the plurality of yarn strands.

The present invention also still further provides a method of sensing the presence and absence of yarn traveling on a conveyor. The method preferably includes providing a yarn contacting portion thereof positioned to abuttingly contacting yarn being transported on a conveyor when being conveyed thereon, activating a switch when the yarn contacting portion is in a first yarn contacting position when contacting strands of yarn, activating the switch when the yarn contacting portion is in a second yarn contacting position when not contacting strands of yarn, and controlling the speed of the take-up of the yarn responsive to the activation of the switch so that yarn take up speed increases when yarn is present and yarn take up speed decreases when yarn is absent. The method can also include further controlling the speed of yarn being fed, e.g., by draw rolls, responsive to the activation of the switch.

The present invention yet further provides a method of handling a plurality of strands of material traveling over a roller. The method preferably includes slidingly moving a plurality of strands of material toward inner medial portions of a roller when traveling over and abuttingly contacting the roller. The slidingly moving step preferably includes traveling along an outer end portion of a roller body having a first circumference inwardly toward the inner medial portions having a second circumference. Also, the first circumference is preferably substantially larger than the second circumference. The method can also include using the roller to assist in separating and guiding the plurality of strands when traveling over and abuttingly contacting the strand handling roller.

The present invention yet still further provides a method of extending the distance from a conveyor to a yarn take-up source. The method preferably includes retracting a distance extending member to a first yarn threading position and extending the distance extending member to a second yarn take-up operating position an extended distance from the first yarn threading position and in a direction away from a yarn take-up source for increasing the distance that the plurality of yarn strands travel prior to being taken up by the yarn take-up source. The method can also advantageously include providing a conveyor which extends in a substantially horizontal plane substantially parallel to a horizontally extending floor and providing a distance extending boom member connected to and extending outwardly from the conveyor in a direction vertically transverse to the conveyor. The distance extending member is preferably connected to the distance extending boom member.

BRIEF DESCRIPTION OF THE DRAWINGS

Some of the features, advantages, and benefits of the present invention having been stated, others will become apparent as the description proceeds when taken in conjunction with the accompanying drawings in which.

DETAILED DESCRIPTION OF PREFERRED EMBODIMENTS

The present invention will now be described more fully hereinafter with reference to the accompanying drawings which illustrate preferred embodiments of the invention. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, the prime notation, if used, indicates similar elements in alternative embodiments.

Figure 1:
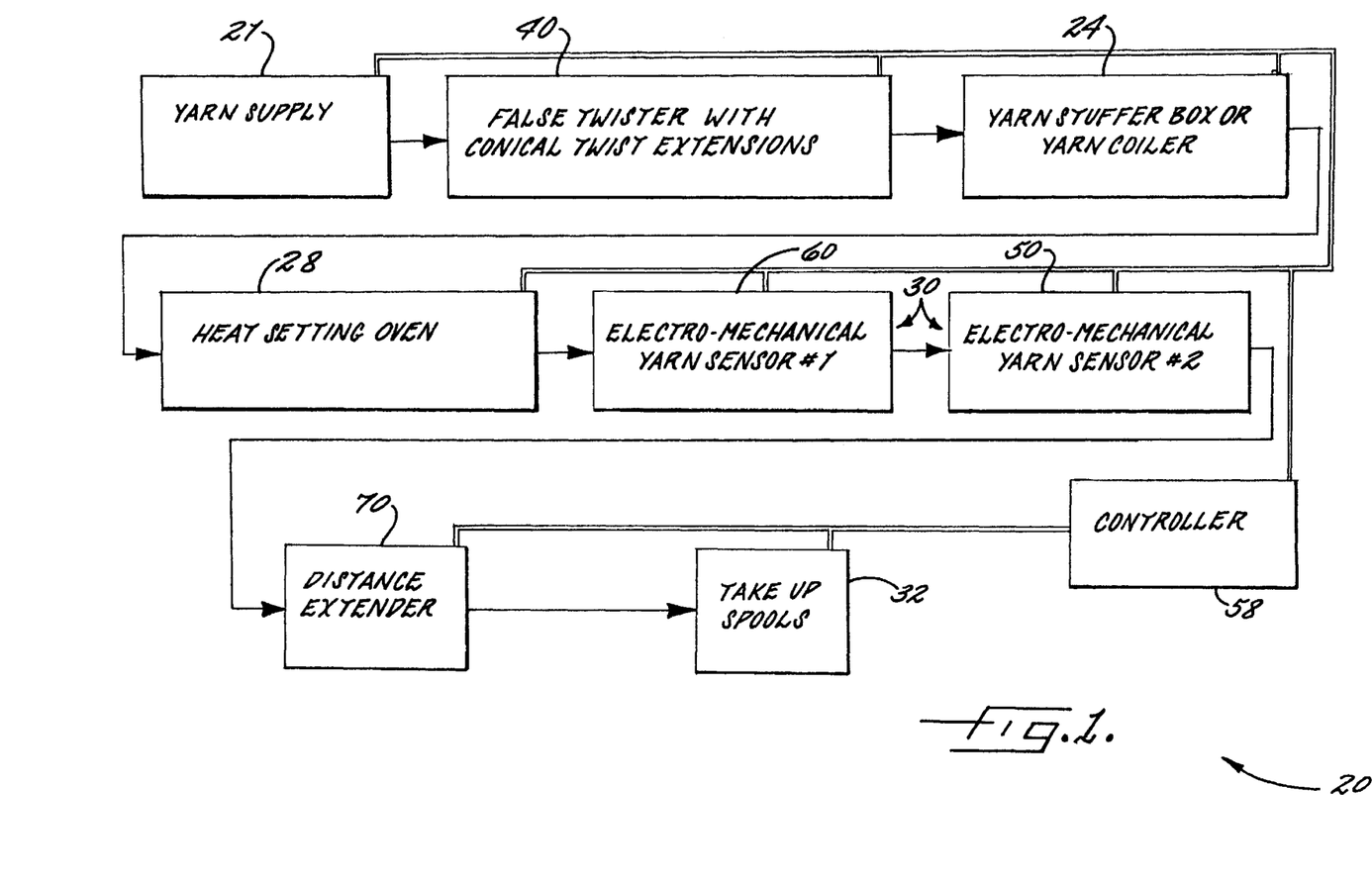
FIG. 1 is a schematic block diagram of an apparatus having an enhanced false twister, an electro-mechanical yarn detector, and a yarn take-up distance extender according to the present invention.
Figure 2:
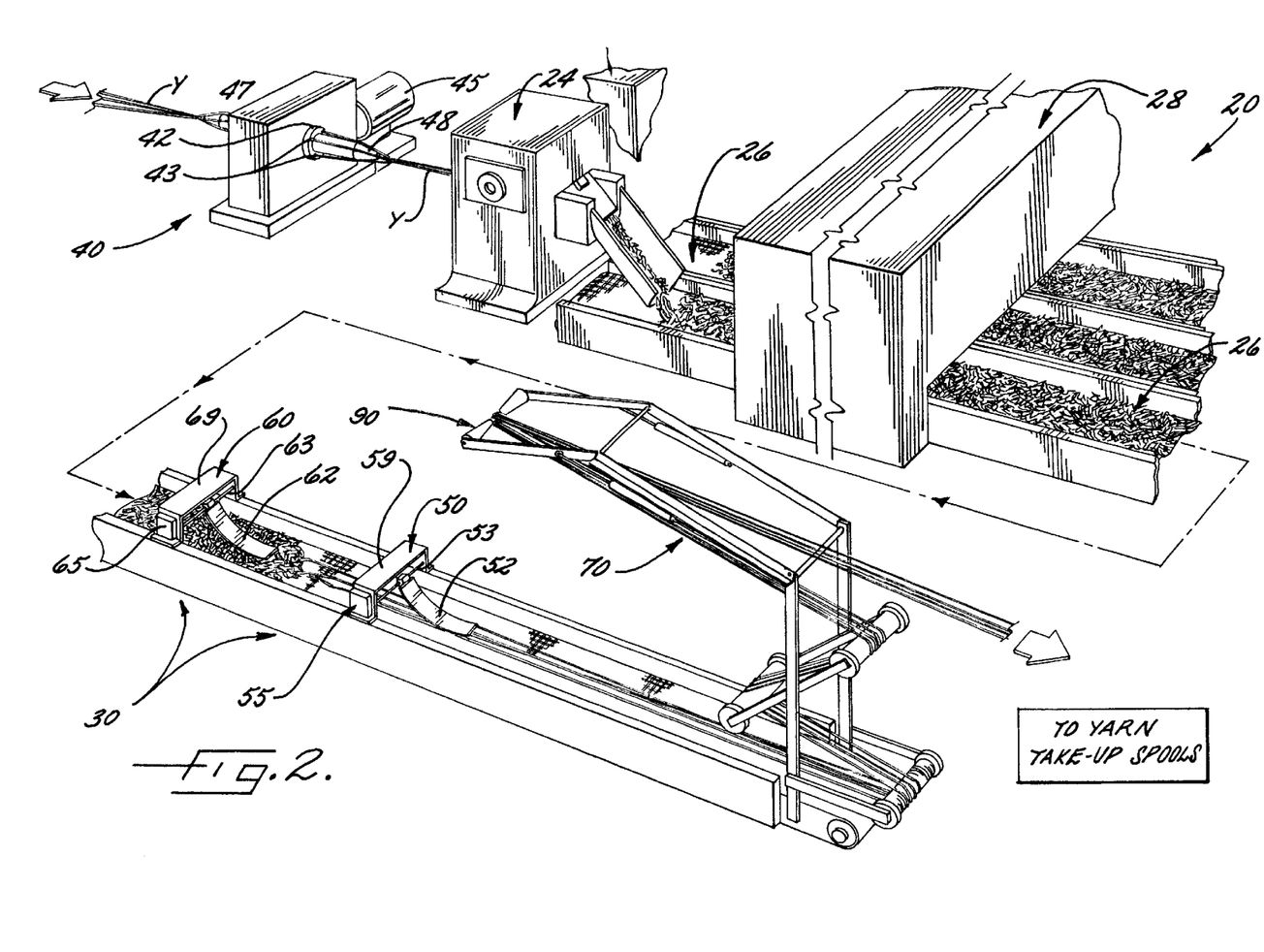
FIG. 2 is a perspective view of an apparatus having an enhanced false twister, an electro-mechanical yarn detector, and a yarn take-up distance extender according to the present invention.

Referring to FIGS. 1–2 illustrate an apparatus for handling and texturizing yarn Y having an enhanced false twister 40, an electro-mechanical yarn detector 50, and a yarn take-up distance extender 70, 70' according to the present invention. The apparatus 20 for handling and texturing yarn Y which preferably includes a yarn supply 21 positioned to supply a plurality of strands of yarn Y. The yarn supply 21 preferably has a plurality of spools of yarn Y supplied through one or more openings as illustrated and as understood by those skilled in the art (see also FIG. 3). The apparatus 20 also has an enhanced false twister 40 positioned downstream from the yarn supply 21 for imparting a false twist to the plurality of strands of yarn. False twisters are well understood by those skilled in the art, and the false twister of the present invention is described further herein in more detail with reference to FIGS. 2–4. A yarn undulation former 24 is positioned downstream from the false twister 40 for forming undulations in each of the plurality of strands of yarn Y. The undulation former 24 can be a yarn stuffer box, a coiler, or other type of undulation former, e.g., bends, circles or rings, or other shaped undulations, as understood by those skilled in the art. A yarn stuffer box is illustrated in FIG. 2 by way of example. Because such stuffer boxes and coilers and the operation thereof are understood by those skilled in the art and for brevity, a further description is not included herein.

The apparatus 20 also includes a conveyor 26 positioned to receive the plurality of yarn strands having undulations formed therein and for conveying the undulated strands of yarn downstream to a heat setting oven 28 positioned downstream from the yarn undulation former 24. As understood by those skilled in the art, the heat setting oven 28 receives the conveyed yarn when passing therethrough to impart heat to the plurality of strands of yarn Y having undulations therein. Fans or other cooling means (not shown) are positioned downstream from the heat setting oven 28 to cool the yarn to assist in setting the undulation in the yarn Y.

The apparatus 20 further has a yarn sensor system 30 positioned downstream from the heat setting oven 28 for sensing the presence and absence of yarn Y being conveyed on the conveyor 26. The yarn sensor system 30 of the present invention is also described in more detail further herein and with reference to FIGS. 2 and 5–7. A yarn take-up distance extender 70, 70' is positioned downstream from the yarn sensor system 30 for extending the distance of travel of the plurality of strands of yarn prior to take-up. Likewise, the first and second embodiments of the yarn take-up distance extender 70, 70' are also described further herein with reference to FIGS. 2 and 8–16. Additionally, the apparatus 20 also has a yarn take-up source 32, as understood by those skilled in the art, positioned downstream from the yarn take-up distance extender 70, 70' for receiving and taking up the plurality of strands of yarn Y. The apparatus 20 of the present invention can also advantageously have a plurality of the features as described above positioned in parallel as suggested by the plurality of conveyors 26 as shown in FIG. 2.

Figures 3, 4:
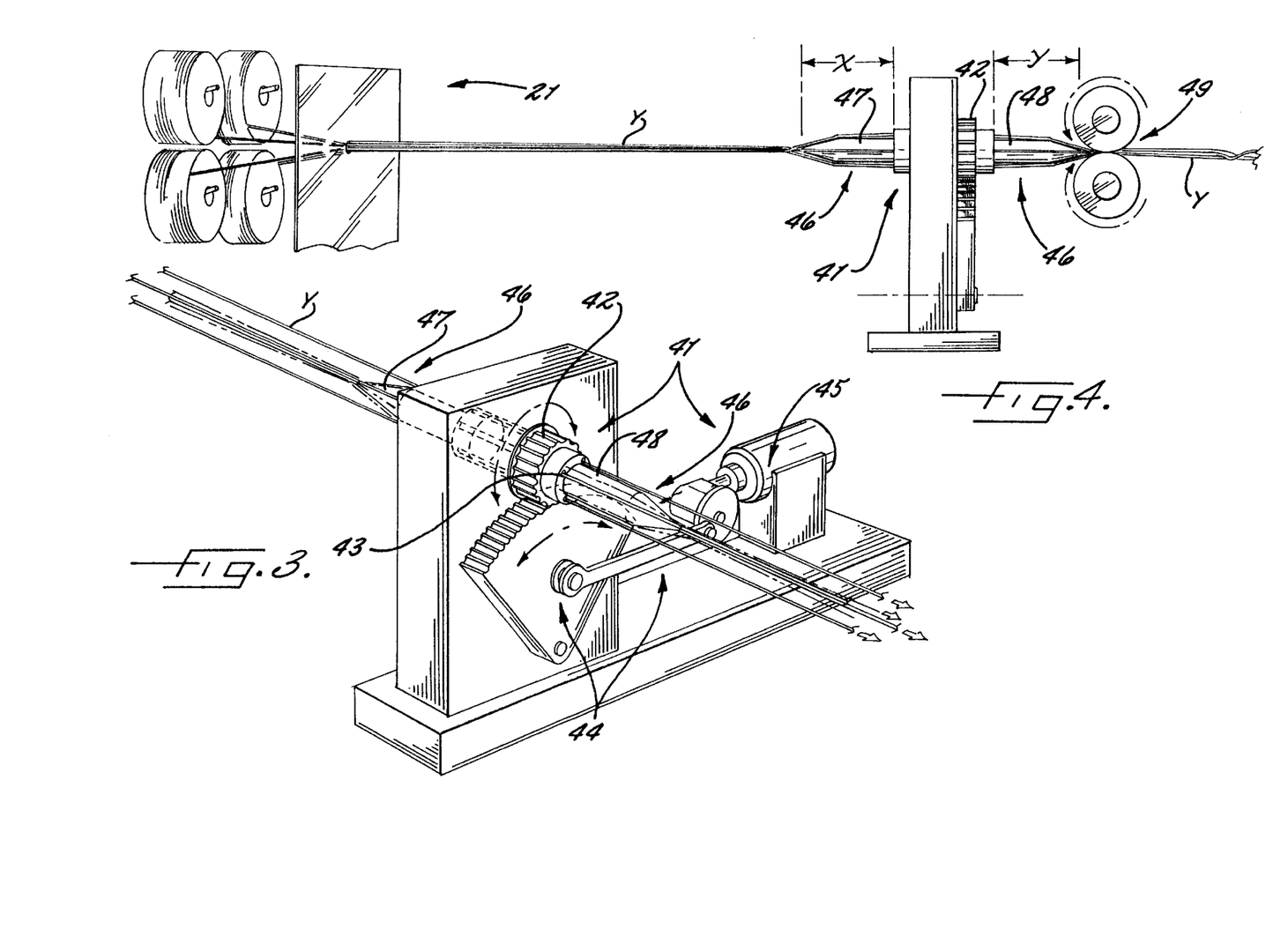
FIG. 3 is a perspective view of an enhanced false twister according to the present invention.
FIG. 4 is a side elevational view of a yarn supply and an enhanced false twister according to the present invention.

As perhaps best illustrated in FIGS. 2–4, the present invention also provides an enhanced yarn false twister 40 for imparting a false twist to a plurality of yarn strands. The yarn false twister 40 preferably includes bi-directional radial twisting means 41 for twisting a plurality of yarn strands in two different radial directions to impart a false twist thereto. The bi-directional radial twisting means 41 preferably includes a rotating member 42 having a plurality of openings 43 formed therein for extending the plurality of strands therethrough. The rotating member 42 is preferably mounted to a housing block as illustrated and preferably has a plurality of teeth or ridges and valleys surrounding the outer peripheries of the rotating member 42. A drive link 44 abuttingly contacts or is connected to the rotating member 42 along the plurality of teeth, e.g., interfaces therewith as illustrated, for driving the rotating member 42 a first predetermined rotary distance in a first rotational direction and a second predetermined rotary distance in a second rotational distance (see directional arrows in FIG. 3). As understood by those skilled in the art, the drive link 44, for example, can include one or more linking arms or drive arms or gear or speed reducers which, in essence, translate the circular or radial motion to an alternating radial motion at a desired speed as illustrated. As understood by those skilled in the art, it is this rotation in opposite radial directions which twists and untwists the plurality of strands to thereby impart the false twist. A drive 45, e.g., a motor and a shaft connected thereto, is also connected to the drive link 44 for driving the drive link 44. The drive 45 is also preferably connected to a controller 58 so that the controller 58 provides control to the drive 45 at preselected drive speeds. The drive 45 preferably provides a circular or radial motion which the drive link then translates into the bi-directional twist by moving a rotating member interface which contacts the rotating member 42 in a first radial direction during a portion of the drive rotation and in the opposite radial direction during another portion of the drive rotation.

The false twister 40 also has twist point distance extending means 46, preferably provided by twist extension members, connected to the bi-directional radial twisting means 41 for extending the twist point distance of the plurality of yarn strands. The twist point distance extending means 46 preferably includes a first conical twist extension member 47 connected to the bi-directional radial twisting means 41 and extending outwardly therefrom so that the plurality of yarn strands are gradually separated prior to travel to the bi-directional twisting means 41 and a second conical twist extension member 48 also connected to the bi-directional radial twisting means 41 and extending outwardly thereform so that the plurality of false twisted plurality of yarn strands gradually gather closely adjacent each other downstream from the bi-directional twisting means 41. At least a pair of draw rolls 49 having a nip point positioned closely adjacent a distal end of the second conical member 48 to enhance the tightening of the false twist prior to compression from the pair of draw rolls 49 and thereby enhance the more even travel of the plurality of strands downstream therefrom. The draw rolls 49, for example, also have a drive and is also preferably connected to the controller 58 for selectively controlling the speed by which the apparatus 20 draws or feeds yarn. The first and second conical members 47, 48 are each connected to the rotating member 42 and each rotate along with the rotating member 42 as the rotating member 42 is being driven by the drive link 44 and the drive 45 connected thereto. Although the conical members 47, 48 are particularly advantageous due to the simplicity, shape, size, and ease of connecting to the rotating member 42, it will be understood by those skilled in the art that other twist extending members, e.g., spacers, bridges, or other shapes, can be used as well according to the present invention. The twist distance extending members, e.g., conical members 47, 48, advantageously allows speed or travel of the yarn through the false twister and yet prevent tangling, enhances evenness of travel of the strands together as a group, and enhances guiding of the strands into and out of the rotating member 42. The conical members 47, 48 are preferably substantially the same length, e.g., see x and y of FIG. 4, so that control of the false twist process and balanced twisting is enhanced.

As illustrated in FIGS. 2 and 5–7, the present invention additionally provides an electro-mechanical sensor system 30 for sensing the presence and absence of yarn Y. The electro-mechanical sensing system 30 preferably includes at least one electro-mechanical yarn detector 50 having a yarn contacting portion 52 thereof positioned to abuttingly contacting yarn Y being transported on a conveyor 26 when being conveyed thereon. The detector 50 also has a switch 55, e.g., preferably provided by an electro-mechanical micro-switch as understood by those skilled in the art, which activates when the yarn contacting portion 52 is in a first yarn contacting position when contacting strands of yarn Y and when the yarn contacting portion 52 is in a second yarn contacting position when not contacting strands of yarn or in the absence of yarn Y. The system 30 also includes a controller 58 connected to the switch 55 for controlling the speed of the take-up of the yarn Y responsive to the activation of the switch 55 so that yarn take up speed increases when yarn is present and yarn take up speed decreases when yarn is absent. The electro-mechanical yarn sensing system 30 of the present invention can also include another electro-mechanical detector 60 also having a yarn contacting portion 62 overlying the conveyor 26 and abuttingly contacting yarn Y when passing thereon and connected to the conveyor 26 and the controller 58 so that the controller 58 also controls the speed of the yarn being fed to the apparatus 20, e.g., by the draw rolls 49.

Figures 5, 6:
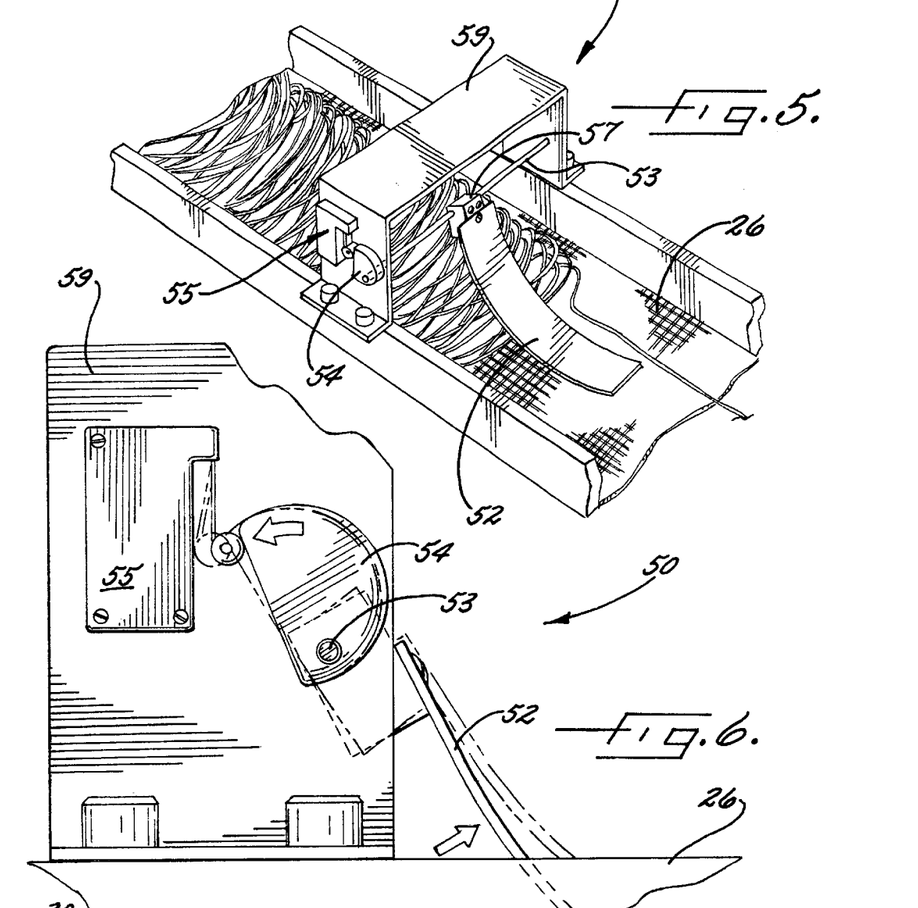
FIG. 5 is a perspective view of an electro-mechanical yarn detector positioned on a yarn conveyor according to the present invention.
FIG. 6 is an enlarged side elevational view of an electro-mechanical yarn detector according to the present invention.
Figure 7:
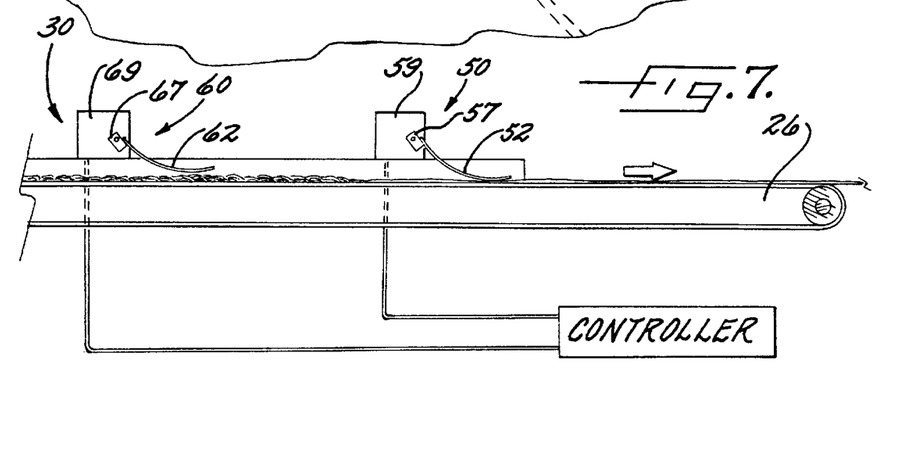
FIG. 7 is a side elevational view of an electro-mechanical yarn detector system according to the present invention.
Figure 8:
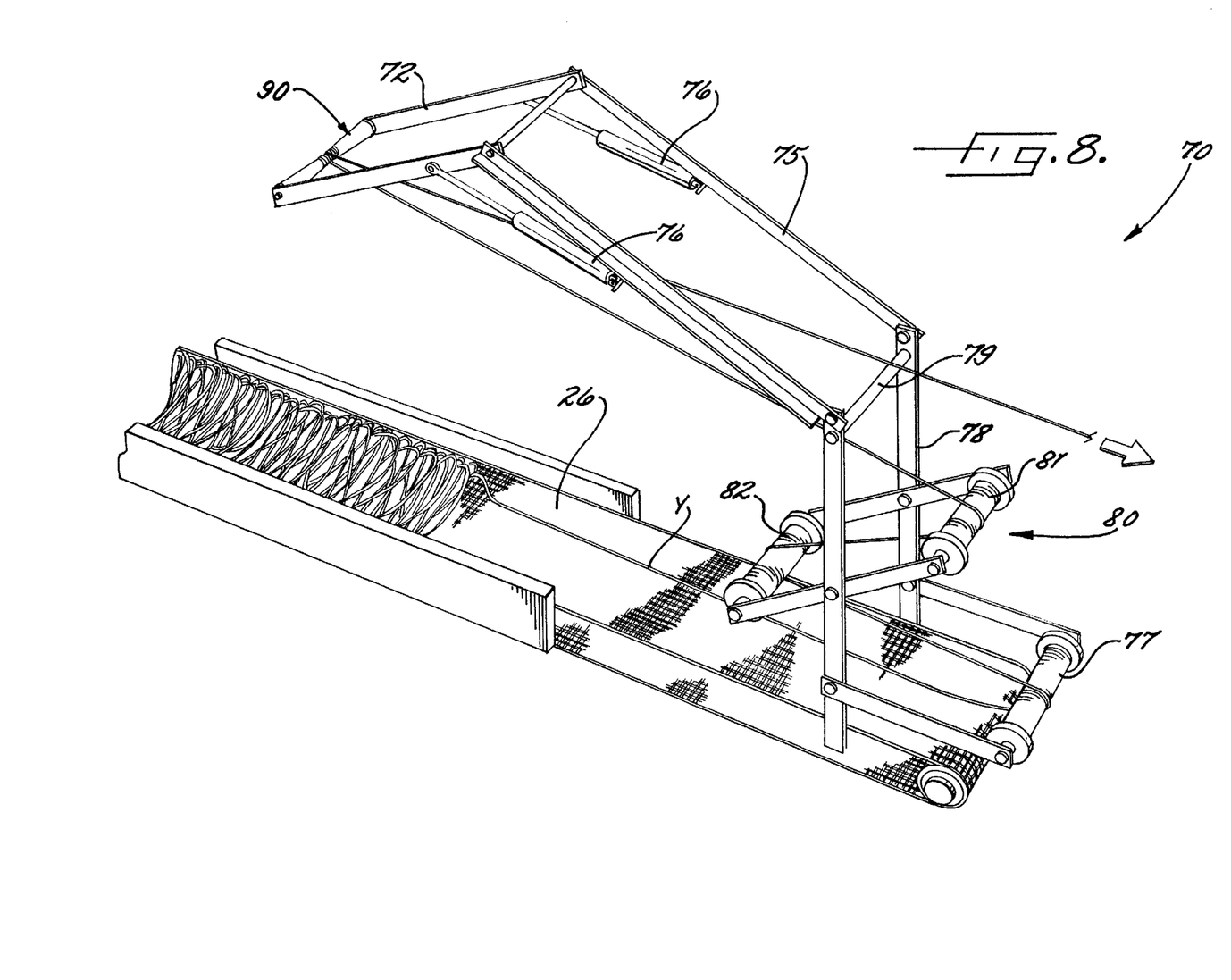
FIG. 8 is a perspective view of a first embodiment of a yarn take-up distance extender according to the present invention.

Each of the electro-mechanical yarn detectors 50, 60 further includes a rod member 53, 63 overlying the conveyor 26, e.g., by a conveyor mounting member 59, 69, and connected to the yarn contacting portion 52, 62, e.g., along a rod mounting member 57, 67 as illustrated, and a cam member 54, 64 (not shown) connected to the rod member 53, 63 positioned to abuttingly contact the switch 55, 65 for activation thereof. The yarn contacting portion 52, 62 also advantageously is preferably formed of a sheet of material, e.g., a metal or plastic, and preferably has an arcuate shape, e.g., at least in a yarn contacting region thereof, to enhance contact control of the electro-mechanical detector 50, 60 with the yarn Y. For example, the arcuate shape is flexible in the sense that it works well with either coils or bunches of yarn, e.g., multiple texture types, rides well over the yarn, e.g., no hanging or snagging, provides a gradual change from sensing different amounts or no yarn, and the tangential point of the arcuate shape provides a minimal point of contact with the yarn, e.g., little impact on speed of the yarn or conveyor and yet effective for sensing.

As perhaps best illustrated in FIGS. 8 and 11–13, the present invention still additionally provides a strand handling roller 90 for handling a plurality of strands of material traveling over and abuttingly contacting therewith. The strand handling roller 90 can advantageously be used in the yarn take-up distance extender 70, 70' as illustrated, but can be used for other applications as well. The strand handling roller 90 preferably includes a roller body 91 having outer end portions 93, 94 having a larger circumference than inner medial portions 95 thereof so that strands traveling over the roller body 91 slidingly moves toward the inner medial portions 95 along the outer surface of the roller body 91 when traveling over and abuttingly contacting the strand handling roller 90. The circumference of the roller body 91 gradually decreases from the outer end portions 93, 94 to the inner medial portions 95 as illustrated. The strand handling roller 90 can also advantageously include the roller body 91 further having a plurality of spaced apart strand grooves 96 formed in the inner medial portions 95 thereof for assisting in separating and guiding the plurality of strands when traveling over and abuttingly contacting the strand handling roller 90. Also, the roller body 91 has non-groove portions of the inner medial portions 95 which define a plurality of ridges 97. As shown, the inner medial portions 95 of the roller body 91 has substantially the same circumference in each of the plurality of grooves 96 and has substantially the same circumference on each of the plurality of ridges 97.

As illustrated in FIGS. 8–16, the present invention further provides a yarn take-up distance extender 70, 70' for extending the distance from a conveyor 26 to a yarn take-up source 32. The yarn take-up distance extender 70, 70' preferably includes a retractable distance extending member 72, 72' overlying a conveyor 26 and which retracts to a first yarn threading position (see FIGS. 9 and 14) adjacent the end portion of the conveyor 26 and extends to a second yarn take-up operating position (see FIGS. 10 and 16) an extended distance from the first yarn threading position and in a direction away from a yarn take-up source 32 for increasing the distance that the plurality of yarn strands travel from the conveyor 26 prior to being taken up by the yarn take-up source 32. The yarn take-up distance extender 70, 70' can also have the conveyor 26 extending in a substantially horizontal plane substantially parallel to a horizontally extending floor (see FIG. 2), and the yarn take-up distance extender 70, 70' further including a distance extending boom member 75, 75' connected to and extending outwardly from the conveyor 26 in a direction vertically transverse to the conveyor 26. The retractable distance extending member 72, 72' is preferably connected to the distance extending boom member 75, 75'.

Figures 9, 10:
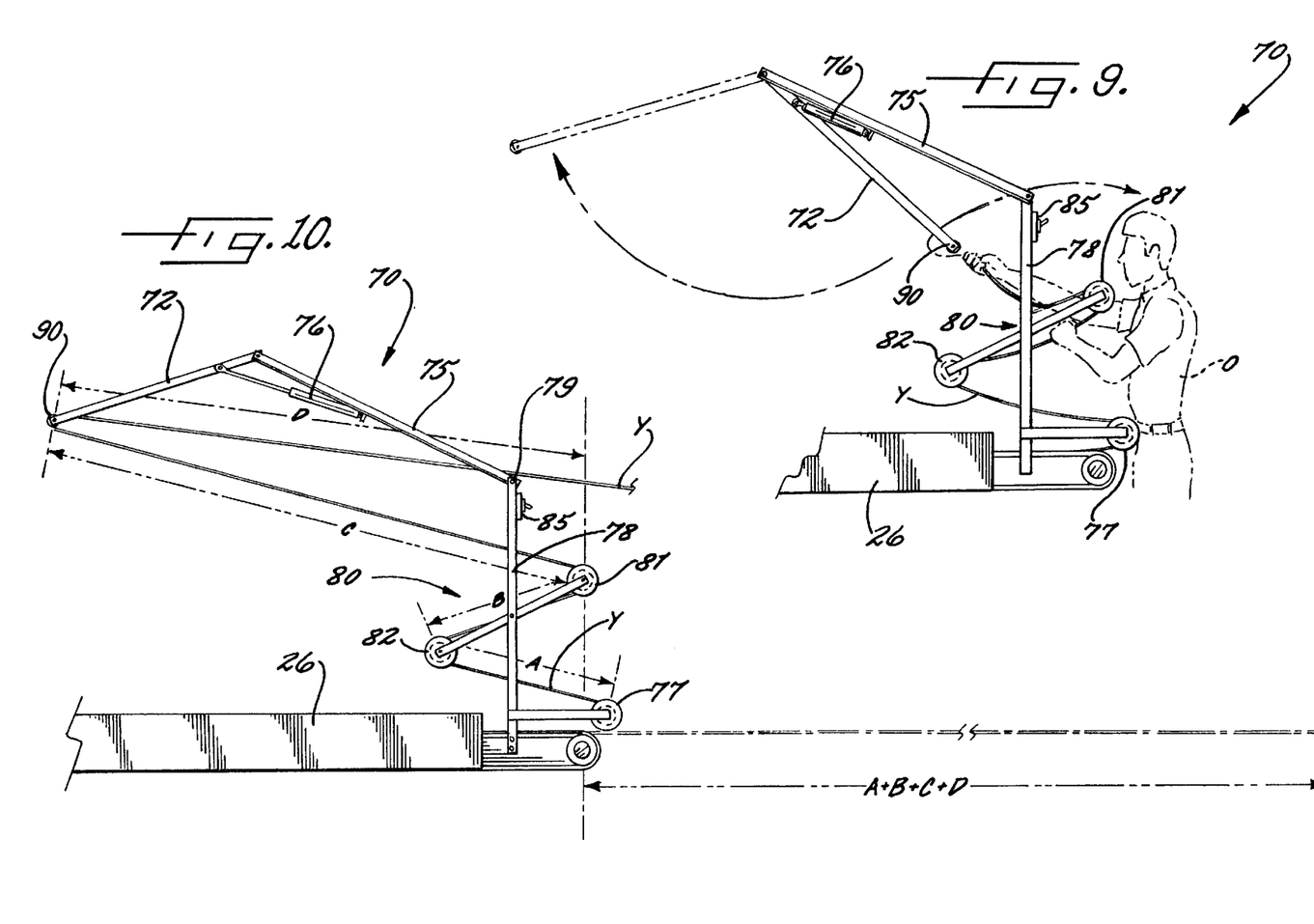
FIG. 9 is a side elevational view of a first embodiment of a yarn take-up distance extender being threaded or loaded with yarn for take-up use according to the present invention.
FIG. 10 is a side elevational view of a first embodiment of a yarn take-up distance extender in an operational position and illustrating the extended distance thereof according to the present invention.

The yarn take-up distance extender further preferably includes yarn tension adjusting means 80, e.g., preferably provided by a pair of spaced-apart rollers 81, 82 in combination pivotally or rotatably mounted to a boom support member 78, positioned to receive the plurality of strands of yarn Y from the conveyor and prior to contact with the retractable distance extending member 72, 72' for selectively adjusting the tension in the plurality of strands of yarn Y between the conveyor 26 and the retractable distance extending member 72, 72'. A user actuator 85, e.g., a control switch, a manual lever, or other manual, pneumatic, electrical, or mechanical actuator as understood by those skilled in the art, is also positioned to retract and extend the retractable distance extending member 72, 72' responsive to a user. Notably, as shown in FIG. 10, the combination of the vertical or transverse distances of the travel of the yarn Y through the distance extender 70, 70' (A+B+C+D) directly correlates or corresponds to what would otherwise be a generally horizontally extending distance between the conveyor 26 and the yarn take-up source 32.

Also, the boom member 75, 75' is preferably retracted and extended by the use of extender and retractor devices 76, 76', e.g., pneumatic devices, mounted to the boom member 75, 75' and the retractable distance extending member 72, 72' and/or the conveyor 26 as illustrated and understood by those skilled in the art, e.g., piston and cylinder. Notably, the mounting of boom member 75' to the conveyor 26 by extender and retractor devices 76' can either be fixedly mounted or a pneumatic or other motion device as described. Due to the cost, handling, simplicity, and freedom associated with the use of pneumatic devices, such pneumatics are preferred. Hydraulics, air, manual, electronic, or other moving or motion techniques, however, can be used as well as understood by those skilled in the art. Additional mounting rollers or mounting rods or guides 77, 77', 79, 79' can be used as well for assisting in guiding and handling the yarn through the distance extender 70, 70' as illustrated.

Figure 14:
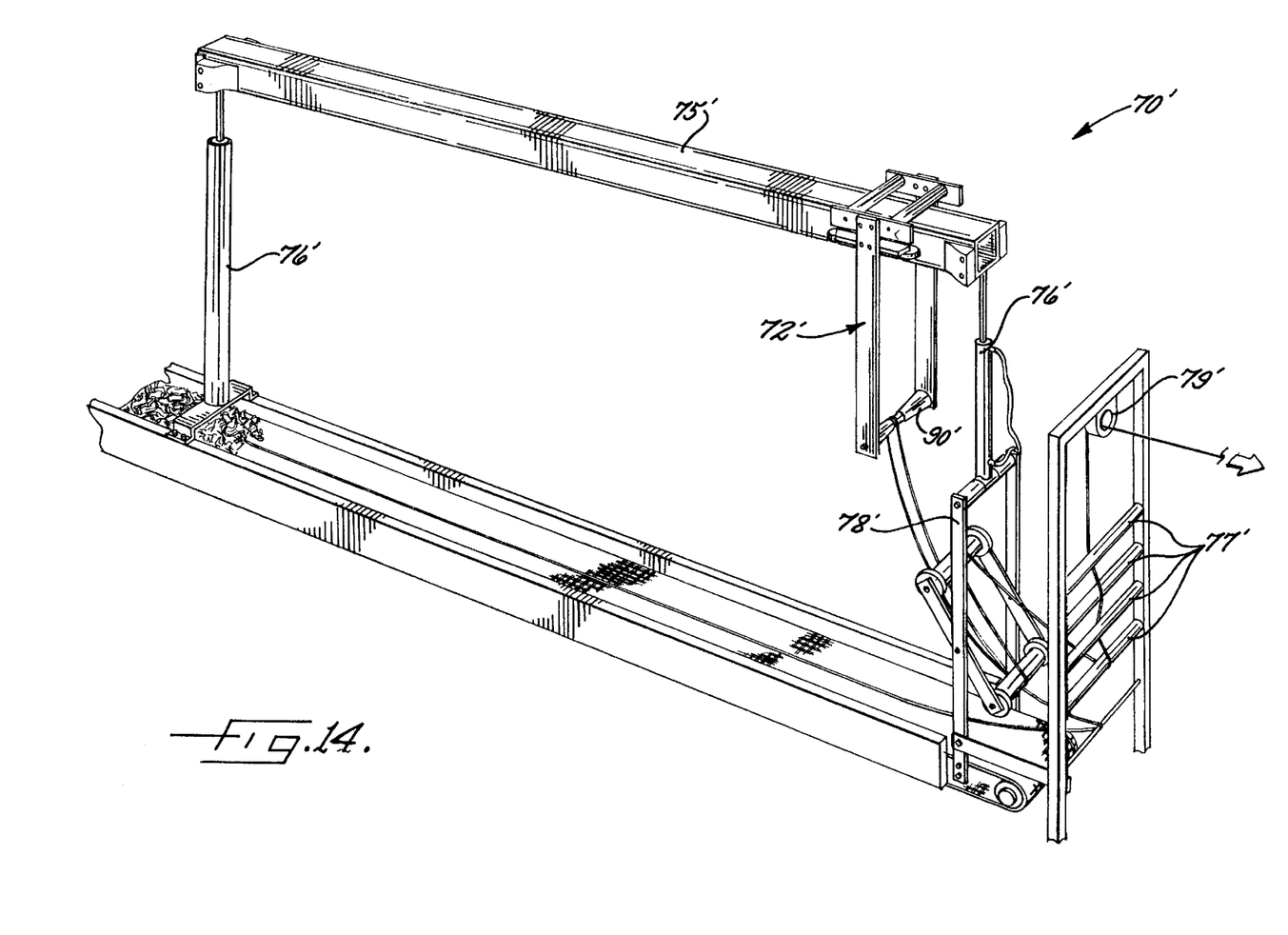
FIG. 14 is a perspective view of a second embodiment of a yarn take-up distance extender according to the present invention.
Figure 15:
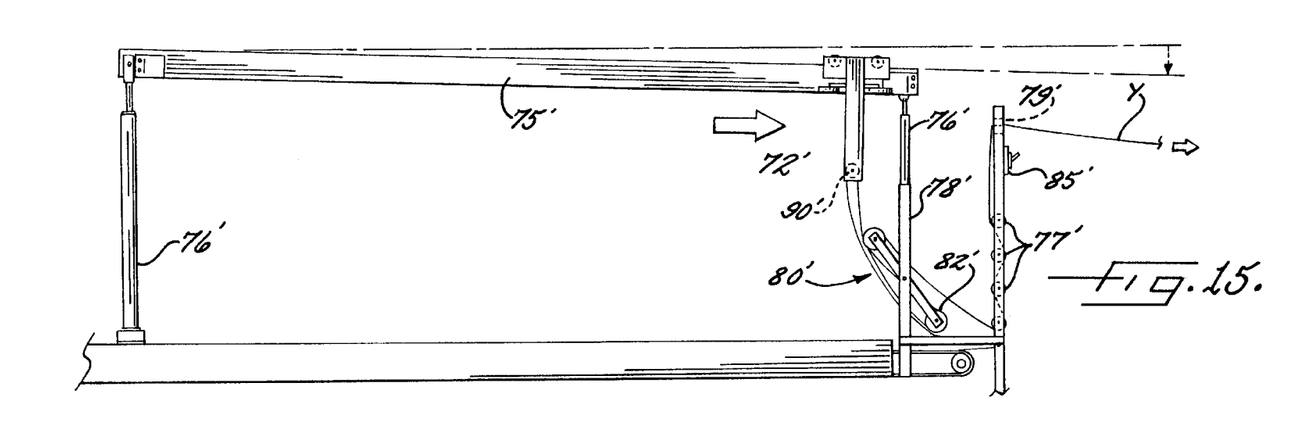
FIG. 15 is a side elevational view of a second embodiment of a yarn take-up distance extender illustrating a threading or loading position according to the present invention.
Figure 16:
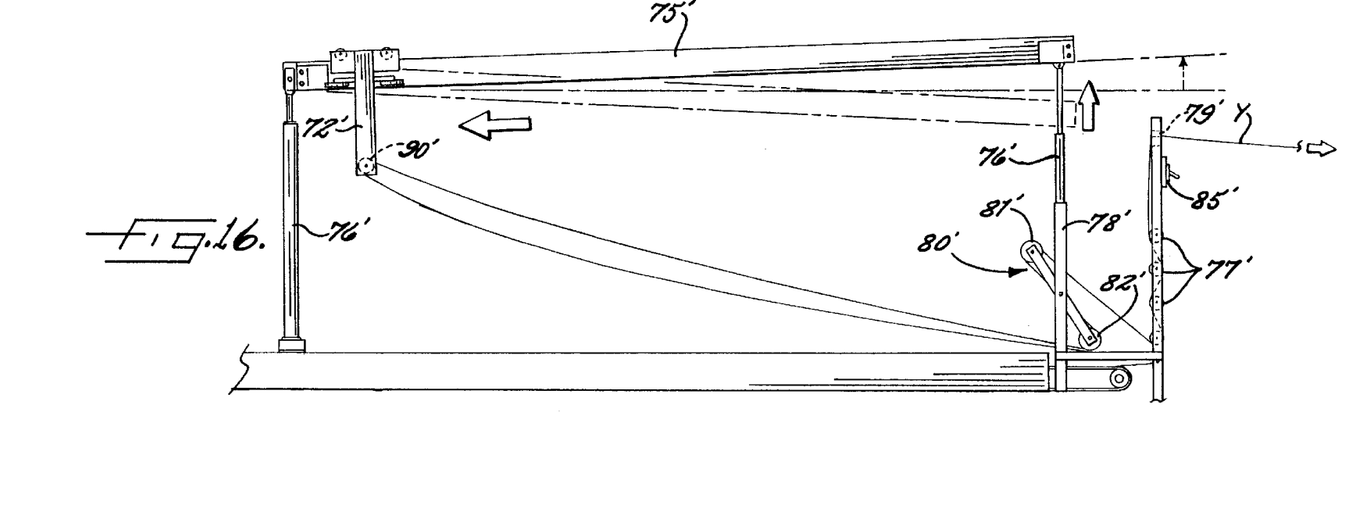
FIG. 16 is a side elevational view of a second embodiment of a yarn take-up distance extender illustrating the operating position for distance extending according to the present invention.

Further, in operation, the operator O can thread the yarn or strands of yarn Y through the distance extender 70, 70'. In the first embodiment as shown in FIGS. 2 and 8–10, the retractable distance extending member 72 moves outwardly from the boom member 75 when in the threading position along an arcuate path of travel (see FIG. 9) to the extended position by the use of the extender and retractor devices 76. In the second embodiment as shown in FIGS. 14–16, on the other hand, the retractable distance extending member 72' moves or travels outwardly along the boom member 75' in a smooth and somewhat linear motion by riding along the boom member 75'. The proximal end portion of the boom member 75' moves up and down to the various positions so that the retractable distance extending member 72' slides along tracks associated with the boom member 75' as illustrated in different inclined positions. The strand handling roller 90, 90' is advantageously mounted to the retractable distance extending member 72, 72' to enhance the guiding and separating of the yarn strands positioned thereon.

As illustrated in FIGS. 1–16, the present invention also provides several associated methods of handling and texturizing yarn Y. For example, the present invention still further provides a method of imparting a false twist to a plurality of yarn strands. The method preferably includes twisting a plurality of yarn strands in two different radial directions to impart a false twist thereto and extending the twist point distance of the plurality of yarn strands (see FIGS. 2–4). The method can also advantageously have the step of extending the twist point distance, e.g., x and y of FIG. 4, also including the steps of gradually separating a plurality of strands of yarn Y prior to the step of twisting in two different radial directions and gradually gathering the plurality of yarn strands closely adjacent each other downstream from the step of twisting in two different radial directions.

The method can further include compressing the plurality of false twisted yarn strands to thereby enhance the more even travel of the plurality of strands downstream therefrom. The step of twisting preferably includes passing the plurality of yarn strands through a rotating member 42 having a plurality of openings 43 formed therein and driving the rotating member 42 a first predetermined rotary distance in a first rotational direction and then a second predetermined rotary distance in a second rotational distance (see FIG. 3). The method can still further include providing first and second conical members 47, 48 each connected to the rotating member 42 and each rotating along with the rotating member 42 to thereby extend the twist point of the plurality of strands.

The present invention also still further provides a method of sensing the presence and absence of yarn Y traveling on a conveyor 26. The method preferably includes providing a yarn contacting portion 52 thereof positioned to abuttingly contacting yarn Y being transported on a conveyor 26 when being conveyed thereon, activating a switch 55 when the yarn contacting portion 52 is in a first yarn contacting position when contacting strands of yarn Y, activating the switch 55 when the yarn contacting portion 52 is in a second yarn contacting position when not contacting strands of yarn, and controlling the speed of the take-up of the yarn responsive to the activation of the switch 55 so that yarn take up speed increases when yarn is present and yarn take up speed decreases when yarn is absent (see FIGS. 5–7). The method can also include further controlling the speed of feed yarn, e.g., the draw rolls 49, responsive to the activation of the switch 55 or 65.

The method can also include abuttingly contacting the switch with a cam member 54 connected to a rod member 53 overlying the conveyor 26. The yarn contacting portion 52 is preferably connected to the rod member 53, and the yarn contacting portion 52 preferably has an arcuate shape to enhance contact control with the yarn Y.

Figures 11, 12, 13:
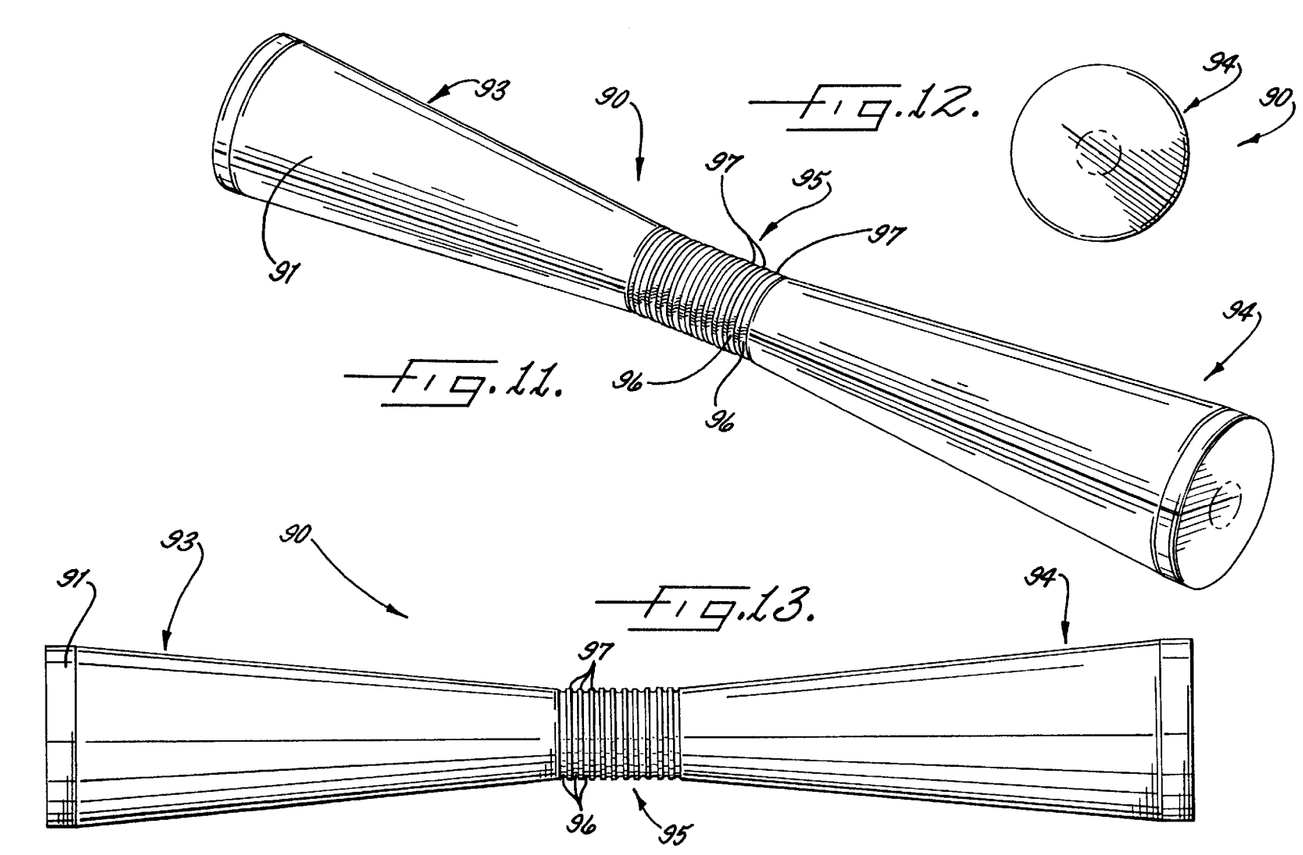
FIG. 11 is a perspective view of a strand handling roller of a yarn take-up distance extender according to the present invention.
FIG. 12 is a side elevational view of a strand handling roller of a yarn take-up distance extender according to the present invention.
FIG. 13 is a front elevational view of a strand handling roller of a yarn take-up distance extender according to the present invention.

The present invention yet further provides a method of handling a plurality of strands of material traveling over a roller 90. The method preferably includes slidingly moving a plurality of strands of material, e.g., yarn, toward inner medial portions 95 of a roller 90 when traveling over and abuttingly contacting the roller 90. The slidingly moving step preferably includes traveling along an outer end portion 93, 94 of a roller body 91 having a first circumference inwardly toward the inner medial portions 95 having a second circumference. The first circumference is preferably substantially larger than the second circumference. The method can also include using the roller 90 to assist in separating and guiding the plurality of strands when traveling over and abuttingly contacting the strand handling roller 90. The method can additionally include the inner medial portions of the roller body having a plurality of spaced-apart grooves 96 and non-groove portions of the inner medial portions 95 which define a plurality of ridges 97. The inner medial portions 95 of the roller body also preferably has substantially the same circumference in each of the plurality of grooves 96 and has substantially the same circumference on each of the plurality of ridges 97.

The present invention yet still further provides a method of extending the distance from a conveyor 26 to a yarn take-up source 32. The method preferably includes retracting a distance extending member 72, 72' to a first yarn threading position and extending the distance extending member 72, 72' to a second yarn take-up operating position an extended distance from the first yarn threading position and in a direction away from a yarn take-up source 32 for increasing the distance that the plurality of yarn strands travel prior to being taken up by the yarn take-up source 32 (see FIGS. 8–10 and 14–16).

The method can also advantageously include providing a conveyor 26 which extends in a substantially horizontal plane substantially parallel to a horizontally extending floor and providing a distance extending boom member 75, 75' connected to and extending outwardly from the conveyor 26 in a direction vertically transverse to the conveyor 26. The distance extending member 72, 72' is preferably connected to the distance extending boom member 75, 75'. The method can further advantageously include the steps of selectively adjusting the tension in the plurality of strands of yarn between the conveyor and the distance extending member and actuating the retracting and extending of the retractable distance extending member responsive to a user.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

What is claimed is:

1. A yarn take-up distance extender for extending the distance of travel for a plurality of yarn strands from a conveyor to a yarn take-up source, the yarn take-up distance extender comprising:

a retractable distance extending member overlying a conveyor and which retracts to a first yarn threading position adjacent the end portion of said conveyor and extends to a second yarn take-up operating position an extended distance from the first yarn threading position and in a direction away from a yarn take-up source for increasing the distance that the plurality of yarn strands travel from the conveyor prior to being taken up by the yarn take-up source.

2. A yarn take-up distance extender as defined. in claim 1, wherein the conveyor extends in a substantially horizontal plane substantially parallel to a horizontally extending floor, wherein said yarn take-up distance extender further includes a distance extending boom member connected to and extending outwardly from said conveyor in a direction vertically transverse to said conveyor, and wherein said retractable distance extending member is connected to said distance extending boom member.

3. A yarn take-up distance extender as defined in claim 2, wherein said yarn take-up distance extender further includes yarn tension adjusting means positioned to receive the plurality of strands of yarn from said conveyor and prior to contact with said retractable distance extending member for selectively adjusting the tension in the plurality of strands of yarn between the conveyor and said retractable distance extending member.

4. A yarn take-up distance extender as defined in claim 3, further including a user actuator for retracting and extending said retractable distance extending member responsive to a user.

5. A method of extending the distance of travel for a plurality of yarn strands from a conveyor to a yarn take-up source, method comprising the steps of:

retracting a distance extending member to a first yarn threading position;

extending the distance extending member to a second yarn take-up operating position an extended distance from the first yarn threading position and in a direction away from a yarn take-up source for increasing the distance that the plurality of yarn strands travel prior to being taken up by the yarn take-up source.

6. A method as defined in claim 5, further comprising the steps of providing a conveyor which extends in a substantially horizontal plane substantially parallel to a horizontally extending floor and providing a distance extending boom member connected to and extending outwardly from the conveyor in a direction vertically transverse to the conveyor, and wherein the distance extending member being connected to the distance extending boom member.

7. A method as defined in claim 6, further comprising selectively adjusting the tension in the plurality of strands of yarn between the conveyor and the distance extending member.

8. A method as defined in claim 7, further comprising actuating the retracting and extending of the retractable distance extending member responsive to a user.

* * * * *

UNITED STATES PATENT AND TRADEMARK OFFICE
CERTIFICATE OF CORRECTION

PATENT NO. : 6,302,308 B1
DATED : October 16, 2001
INVENTOR(S) : Hoover et al.

Page 1 of 1

It is certified that error appears in the above-identified patent and that said Letters Patent is hereby corrected as shown below:

Column 6,
Lines 44-45, between "point" and "positioned", please insert -- is --.

Column 12,
Line 5, after "position;", please insert -- and --.

Signed and Sealed this

Thirtieth Day of April, 2002

Attest:

Attesting Officer

JAMES E. ROGAN
Director of the United States Patent and Trademark Office